United States Patent
Parsons et al.

(10) Patent No.: US 9,845,025 B2
(45) Date of Patent: Dec. 19, 2017

(54) RIGID T-RAIL CONDUCTOR SYSTEM

(71) Applicant: AFL Telecommunications LLC, Duncan, SC (US)

(72) Inventors: David Eric Parsons, Simpsonville, SC (US); James Logan, Greer, SC (US); Michael D. Haines, Crown Point, IN (US)

(73) Assignee: AFL Telecommunications LLC, Duncan, SC (US)

( * ) Notice: Subject to any disclaimer, the term of this patent is extended or adjusted under 35 U.S.C. 154(b) by 282 days.

(21) Appl. No.: 14/648,550

(22) PCT Filed: Dec. 2, 2013

(86) PCT No.: PCT/US2013/072642
§ 371 (c)(1),
(2) Date: May 29, 2015

(87) PCT Pub. No.: WO2014/085812
PCT Pub. Date: Jun. 5, 2014

(65) Prior Publication Data
US 2015/0298578 A1    Oct. 22, 2015

Related U.S. Application Data

(60) Provisional application No. 61/731,604, filed on Nov. 30, 2012.

(51) Int. Cl.
*B60M 1/30* (2006.01)

(52) U.S. Cl.
CPC .................... *B60M 1/307* (2013.01)

(58) Field of Classification Search
CPC ... B60L 5/39; H01H 3/00; H01H 1/58; B60M 1/307

USPC .......................................... 191/22 R; 104/98
See application file for complete search history.

(56) References Cited

U.S. PATENT DOCUMENTS

| 4,047,600 A | * | 9/1977 | Maitland | B60M 1/305 |
| | | | | 174/94 S |
| 4,250,982 A | * | 2/1981 | Senften | B60M 1/18 |
| | | | | 191/39 |
| 6,009,987 A | * | 1/2000 | Siessl | B60L 5/205 |
| | | | | 191/59.1 |

(Continued)

FOREIGN PATENT DOCUMENTS

| EP | 1 484 214 A1 | 12/2004 |
| JP | 2010-195247 A | 9/2010 |

OTHER PUBLICATIONS

International Search Report for PCT/US2013/072642 dated Apr. 15, 2014.
Written Opinion for PCT/US2013/072642 dated Apr. 15, 2014.

*Primary Examiner* — Jason C Smith
(74) *Attorney, Agent, or Firm* — Dority & Manning, P.A.

(57) ABSTRACT

The rigid T-rail conductor system is configured to support a contact wire in an overhead railway electrification system. The rigid T-rail includes a first rail configured to be disposed in an overhead position of the railway electrification system. The rigid rail includes a keeper disposed on a side of the first rail, the keeper configured to be movable. When the keeper is in the first position, the keeper holds and affixes the wire on the first rail. When the keeper is in the second position, the keeper allows the wire to be installed or to be removed from the rail.

26 Claims, 10 Drawing Sheets

(56) References Cited

U.S. PATENT DOCUMENTS

| | | | | |
|---|---|---|---|---|
| 6,938,742 B2* | 9/2005 | Nunlist | ................. | B60M 1/305 |
| | | | | 191/44.1 |
| 2011/0307113 A1* | 12/2011 | Kumar | ................... | B60M 3/00 |
| | | | | 700/291 |
| 2015/0298578 A1* | 10/2015 | Parsons | ................. | B60M 1/307 |
| | | | | 191/44.1 |

* cited by examiner

RIGID T-RAIL CONDUCTOR SYSTEM

CROSS-REFERENCE TO RELATED APPLICATIONS

This application is based upon and claims the benefit of priority from U.S. Provisional Application No. 61/731,604 filed on Nov. 30, 2012 in the United States Patent and Trademark Office, the disclosure of which is incorporated herein in its entirety by reference.

BACKGROUND

1. Field

The invention relates to the field of electric current collection/distribution systems for railway traction systems. More particularly, the invention relates to the field of electric current collection/distribution systems employing an overhead third rail.

2. Related Art and Background

Railway traction systems trains and subways, employ a variety of electric current collection/distribution systems such as: traditional third rail collection/distribution systems, overhead third rail collection/distribution system, tramway suspension systems, and flexible overhead contact line or catenary.

Traditional third rail collection/distribution system have been broadly used for many years for railway electrification in metropolitan railways because they are simple, robust and easy to maintain. However, such systems pose a significant risk that accidental contact with the electrified rail occurs since the rail is normally located in easily accessible areas. Because of the above risk such systems are not used in high-voltage and high-power systems. Consequently, they are not suitable for high traveling speeds.

Another commonly used electric current collection/distribution system is the overhead flexible contact line collection/distribution system, also known as flexible catenary or catenary. The catenary systems have the advantage that they present a better dynamic performance of the catenary—pantograph system which makes this system suitable for high speed trains. However, the catenary systems have a number of significant drawbacks. A first drawback comes from the fact that the catenary systems involve a large number of components and, consequently, they require greater assembly and maintenance costs. Another drawback comes from the fact that catenary systems require greater overall height and consequently they are difficult to assemble in tunnels with tight clearance gauges. Further, another drawback comes from the fact that the flexible catenary requires a power distribution messenger cable or wire which makes installation more expensive.

The overhead third rail collection/distribution system has many of the advantages of the traditional third rail systems. However, the overhead third rail collection/distribution system does not pose such a significant risk of accidental contact with the electrified rail because it is disposed at an elevated height over the track. Thus, such a system can be used with higher voltages and higher speed trains. When compared with other overhead collection/distribution systems, such as the flexible catenary, the overhead third rail collection/distribution system has the advantage that it requires less overall height for its assembly and thus overhead third rail collection/distribution system is more suitable for use in tunnels, overpasses, maintenance shops, and bridges. Further, third rail distribution systems do not require a power distribution messenger cable or wire. Thus, overhead third rail collection/distribution system systems may be used, among others, in high speed applications and in situations involving a reduced height.

Figure 1:
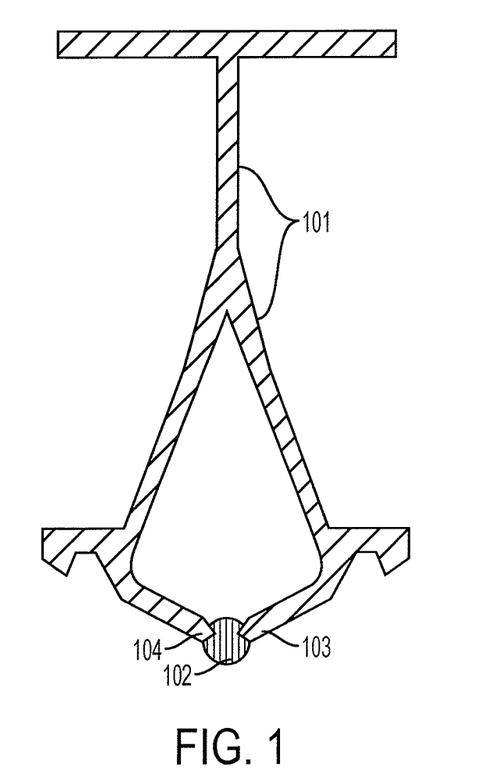
FIG. 1 shows a schematic diagram of an overhead third rail collection/distribution system according to the prior art.

Examples of overhead third rail collection/distribution system are presented in European Patent Application EP1484214A1. A first overhead third rail collection/distribution system disclosed in the aforementioned patent includes a hollow rail constituted of an extruded aluminum profile and a copper wire disposed in the lower part of the aluminum rail such that the pantograph makes contact with the copper wire. Two sides of the profile hold the wire affixed to the profile by the elastic force in the sides of the profile. A second overhead third rail collection/distribution system disclosed in European Patent Application EP1484214A1 includes a Y-shaped aluminum profile 101 and a copper wire 102, as shown in FIG. 1. The sides 103 and 104 of the aluminum profile are holding or affixing the copper wire 102 to the aluminum profile 101 by an elastic force. The copper wire may include two groves formed along the length of the wire such as to affix the wire to the aluminum profile. The copper wire may be replaced by elastically forcing the sides 103 and 104 apart such as to create a gap larger than the wire. However, the above overhead third rail collection/distribution systems have the drawback that it is rather difficult to replace or install the wire since that requires the operator to elastically force apart the sides of the aluminum profile and wire installation requires special tools outside of standard lineman's tools for installation and maintenance. Consequently, installation and maintenance costs for such systems may be high.

Thus, there is a need for overhead third rail collection/distribution systems that allow for ease of installation and maintenance and do not require special tools outside of standard lineman's tools for installation and maintenance. Also, there is a need for overhead third rail collection/distribution systems that allow for joint use within trolley systems and pantograph systems. Further, there is a need for overhead collection/distribution systems that do not need a secondary feeder or messenger.

SUMMARY

Exemplary embodiments of the present invention provide a rigid rail conductor system for supporting at least one contact wire in an overhead railway electrification system.

Additional features of the invention will be set forth in the following description, and in part will be apparent from the description, or may be learned from practice of the invention.

An exemplary embodiment of the present invention provides a rigid rail conductor system for supporting at least one contact wire in an overhead railway electrification system. The rigid rail may include a T-rail configured to be disposed in an overhead position of the railway electrification system. The T-rail may be configured to support and affix to the rail a conductive wire. The rigid rail may further include a keeper disposed on a side of the T-rail, the keeper being configured to be movable between a first position and a second position. When the keeper is in the first position, the keeper holds and affixes the wire on the T-rail. When the keeper is in the second position, the keeper allows the wire to be removed from the T-rail.

The keeper may be kept attached to the T-rail by a hinge or pivot point of keeper extrusion such that when the conductive wire is replaced or installed the keeper does not separate from the T-rail. The keeper may be affixed to the T-rail by one or more set screws, captive screws or fasteners.

The keeper may include a protrusion disposed on one side of the keeper and extending over the length of the keeper such that the protrusion fits into a grove formed over the length of the wire such as to keep the wire attached to the T-rail.

An exemplary embodiment of the present invention provides a rigid rail conductor system including a holder configured to support or suspend the rigid rail conductor system in an overhead position. The holder may be an extrusion holder keyed to the T-rail such as to ensure the alignment of one or more T-rail sections and one or more T-rail components. The holder may include an insulator attached to the holder and/or the T-rail such that the insulator is configured to provide electrical isolation between live portions of the T-rail and the overhead structures supporting the T-rail.

An exemplary embodiment of the present invention provides a rigid rail conductor system including a feeder assembly configured to provide a point of connection between the T-rail and a power station for transmitting electric current to the rigid rail conductor system. The feeder assembly may include a bi-metallic plate configured to transfer current from a bronze-feeder to an aluminum profile such as to prevent corrosion from occurring between dissimilar metals. The bi-metallic plate may include one top side made of bronze fused or joined with one bottom side made of aluminum. The feeder assembly may be tin-plated such as to prevent corrosion from occurring between dissimilar metals.

An exemplary embodiment of the present invention provides a rigid rail conductor system including a T-rail expansion joint assembly configured to accommodate expansion and contraction of the T-rail because of temperature variations. The T-rail expansion joint assembly may include one or more continuity shunts connecting successive T-rail segments of the rigid conductor system. The successive T-rail segments may be separated by gaps configured to accommodate the expansion and contraction of the T-rail segments. The continuity shunts may be formed of flexible conductors and may comprise a plurality of bent sections having a gaping between them. The T-rail expansion joint assembly may further include one or more pantograph gliders configured to protect pantograph carbons of a vehicle as the pantograph moves over the gaps between successive T-rail segments in the expansion joint assembly. The T-rail expansion joint assembly may further include one or more strength members disposed over the gaps between successive T-rail segments. The strength members may mimic the shape of the T-rail thereby creating a smooth passage for a trolley shoe.

An exemplary embodiment of the present invention provides a rigid rail conductor system including a T-rail section isolation assembly configured to electrically isolate from each other a first T-rail section of the rigid rail conductor system and a second T-rail section of the T-rail conductor system. The first T-rail section may be powered by a first power source and the second T-rail section may be powered by a second power source different from the first power source. The T-rail section isolation assembly may include an insulation member configured to insulate from each other the first T-rail section and the second T-rail section. The first T-rail sections may be separated from the second T-rail section by a gap. The T-rail section isolation assembly may further include one or more pantograph gliders configured to protect pantograph carbons of a vehicle as the pantograph moves over a gap between first T-rail section and the second T-rail section. The T-rail section isolation assembly may include a non-conductive strength member disposed over a gap between the first T-rail section and the second T-rail section. The non-conductive strength member may mimic the shape of the T-rail thereby creating a smooth passage for a trolley shoe.

An exemplary embodiment of the present invention provides a rigid rail conductor system including a T-rail mid-point assembly configured to create a fixed point in the middle of a span of the T-rail such that expansion and contraction is directed away from the mid-point assembly. The mid-point assembly may include a mid-point bracket attached on a T-rail section. The mid-point bracket may be attached and fixed to an external supporting structure.

An exemplary embodiment of the present invention provides a rigid rail conductor system including a T-rail insulated support bracket assembly configured to lock the T-rail from moving fore and aft. The T-rail insulated support bracket assembly may include one or more support insulators mounted on a T-rail holder and mounted to the underside of an external supporting structure.

The foregoing general description and the following detailed description are only exemplary and explanatory and they are intended to provide further explanation of the invention as claimed.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, exemplary embodiments of rigid T-rail conductor systems are disclosed. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order or importance, but rather the terms first, second, etc. are used to distinguish one element from another.

Although some features may be described with respect to individual exemplary embodiments, aspects need not be limited thereto such that features from one or more exemplary embodiments may be combined with other features from one or more exemplary embodiments.

The aspects of the invention in this application are not limited to the disclosed elements, components, configurations, operations and sequence of operations. For instance, elements and components may be consolidated, may be omitted, and may be altered without departing from the spirit and scope of the present invention.

Aspects of the rigid T-rail conductor system, according to a first exemplary embodiment of the present invention, are further described with reference to FIGS. 2(a)-(c) and FIGS. 3(a)-(b). FIG. 2(a) shows a three dimensional view of a T-rail extrusion 1, FIG. 2(b) shows a side view of the T-rail extrusion 1, and FIG. 2(c) shows a cross-section, along the line A-A in FIG. 2(b), of the T-rail extrusion 1. FIG. 3(a) shows a three dimensional exploded view of the T-rail extrusion 1 and FIG. 3(b) shows a cross-section of an exploded view of the T-rail extrusion 1 according to a first exemplary embodiment of the invention.

Figure 3:
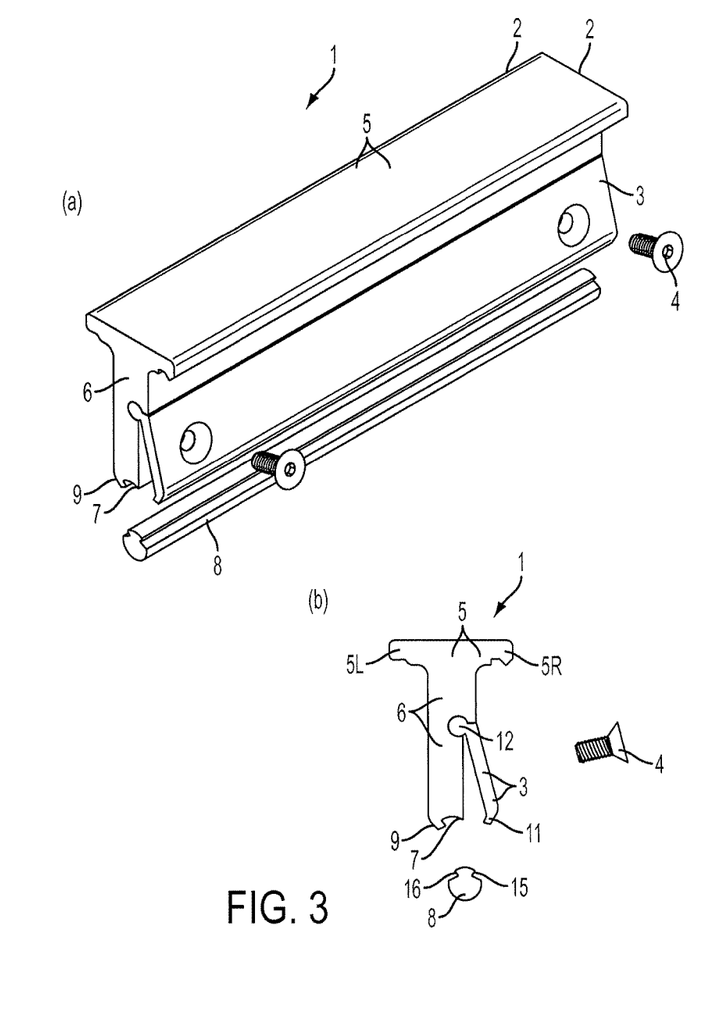
FIG. 3(a) shows a three dimensional exploded view of the T-rail extrusion according to a first exemplary embodiment of the present invention.
FIG. 3(b) shows a cross-section of an exploded view of the T-rail extrusion according to a first exemplary embodiment of the present invention.

The T-rail extrusion 1 may include: a rigid rail 2, a keeper or a cover element 3, and one or more screws, captive screws or fasteners 4. The rigid rail 2 may include: a side base 5, a central span 6, a first opening 7 (as seen in FIG. 3) for accepting a conductive wire 8, and a protrusion 9. The keeper 3 may be disposed on one side of the rigid rail 2 such as to hold and affix the conductive wire 8 to the rigid rail 2. The keeper or cover element 3 may be attached to the rigid rail by the set screws 4 or in other ways. However, the skilled artisan would understand that the T-rail extrusion may be configured in many other configurations without departing from the spirit and scope of the present invention.

The central span 6 has a first end disposed on the side base 5 and extends from the side base 5 towards a second end having the first opening 7. The conductive wire 8 may be disposed in the first opening 7 and may be affixed to the rigid rail by a protrusion 11 of keeper or cover element 3, when the keeper 3 is affixed to the rigid rail, and the protrusion 9 of the rigid rail.

Figure 2:
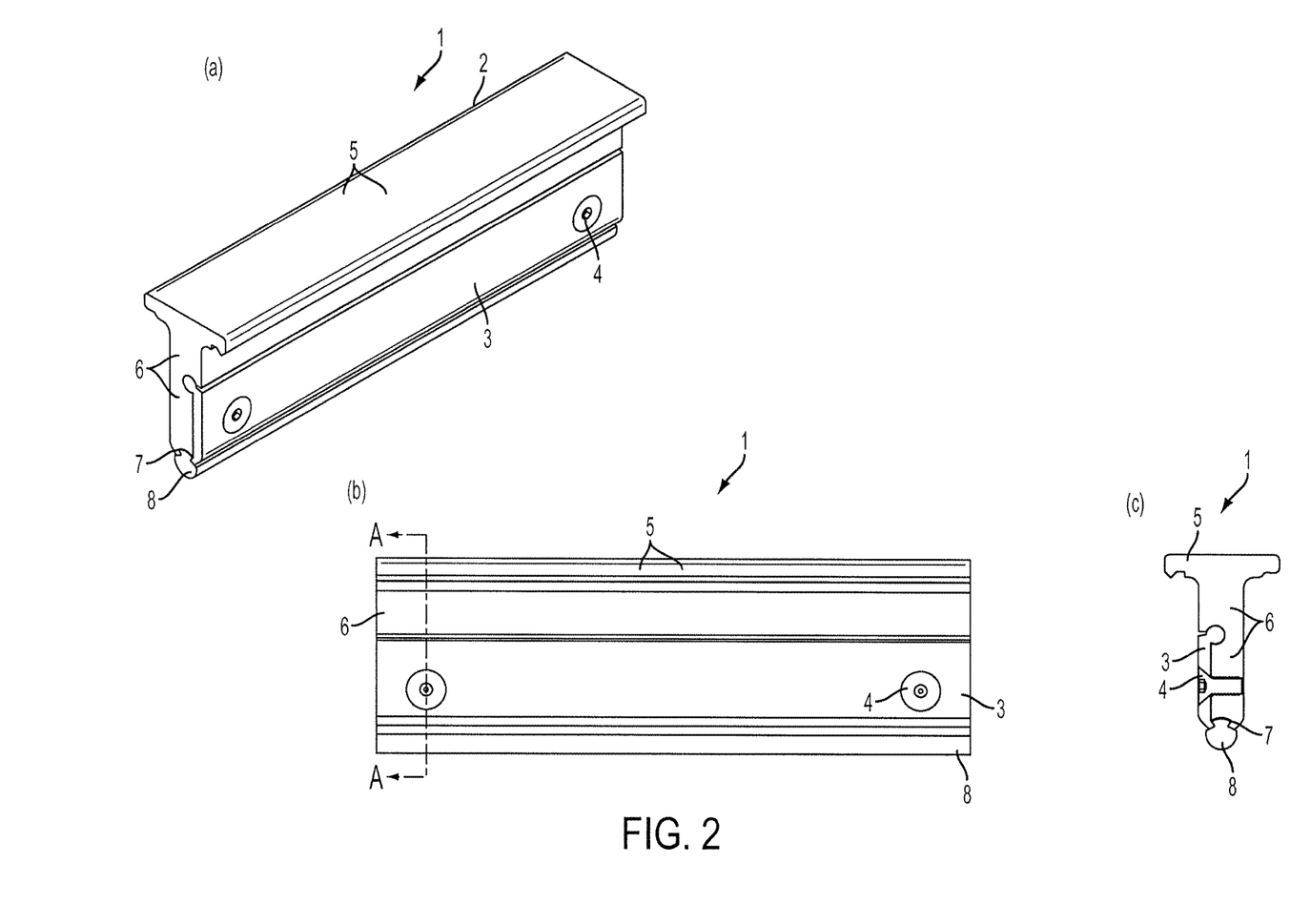
FIG. 2(a) shows a three dimensional view of a T-rail extrusion according to a first exemplary embodiment of the present invention.
FIG. 2(b) shows a side view of the T-rail extrusion according to a first exemplary embodiment of the present invention.
FIG. 2(c) shows a cross-section, along the line A-A in FIG. 2(b), of the T-rail extrusion according to a first exemplary embodiment of the present invention.

The keeper 3 may be attached to the rigid rail by a hinge 12. The keeper may include a first rounded side 13 and the rigid rail may include a rounded grove 14 for accepting the rounded side 13 such that the rounded side 13 may move in the rounded grove 14 thereby forming the hinge 12. The hinge 12 may allow the keeper 3 to move from a first position A to a second position B. FIG. 2 show the keeper in position A in which the keeper holds and affixes the wire on the rigid rail 6. FIG. 3 show the keeper in position B in which the keeper is open and allows the wire to be installed on the rail or to be removed from the rail. When the keeper 3 is moved from the first position A to the second position B, the keeper may be kept attached to the first rail by the hinge 12 such that when the conductive wire 8 is replaced or installed, in the rigid rail 2, the keeper 3 does not separate from the rigid rail 2.

The keeper 3 may comprise two or more keepers disposed sequentially on a continuous section of the rigid T-rail, each of the two or more keepers having a length which is less than the total length of the continuous rigid T-rail section. One or more of the sequentially disposed keepers may be removable from the continuous T-rail section. The keeper or cover element 3 may be a cover element. The cover element may be removable from the rigid rail 2 when the installing or replacing of the wire is performed. The wire may have a first channel grove 15 and a second channel grove 16 formed along the wire such that the protrusions 9 and 11 fit in the channel groves 15 and 16 thereby holding and affixing the wire to the rigid rail into a rigid rail—conductive wire assembly. However, the skilled artisan would understand that the keeper may be configured in many other configurations without departing from the spirit and scope of the present invention.

Figure 4:
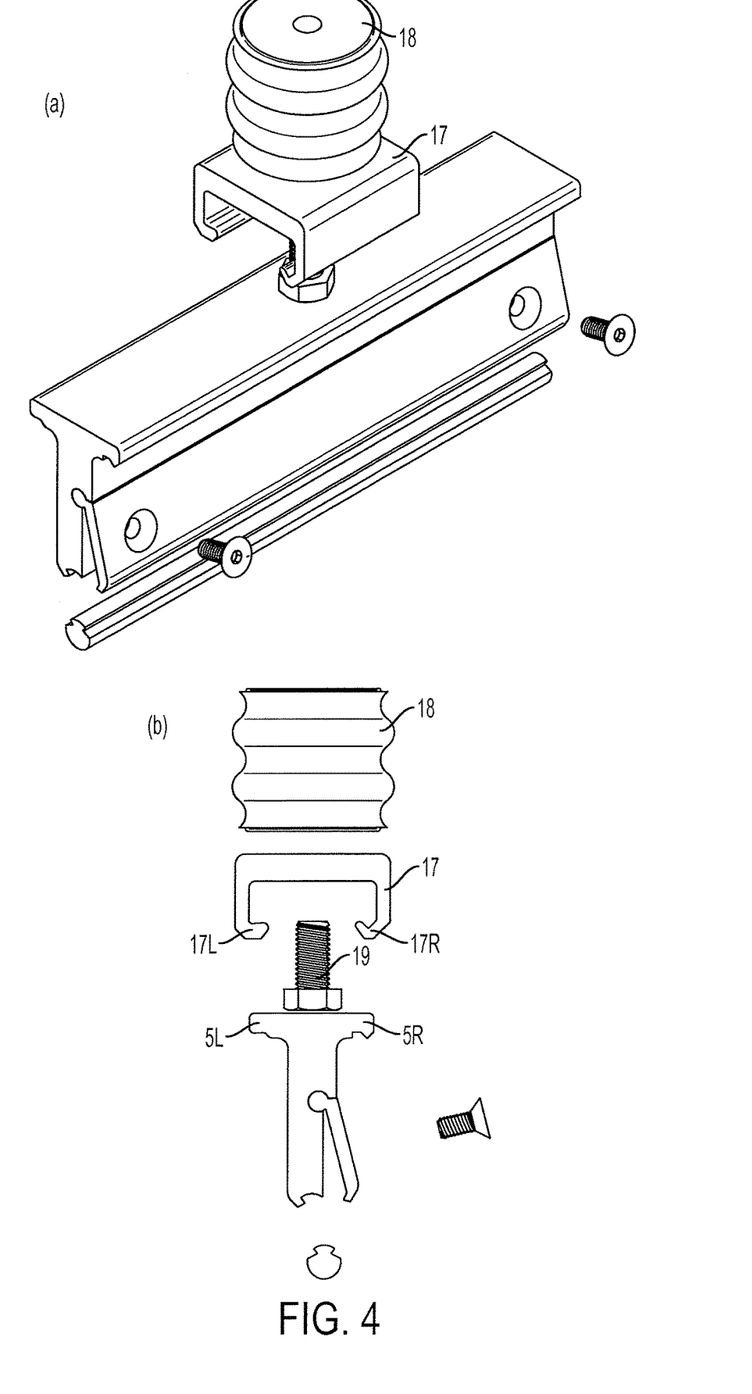
FIG. 4(a) shows a three dimensional exploded view of a T-rail with holder according to the second exemplary embodiment of the present invention.
FIG. 4(b) shows a cross-section of an exploded view of a T-rail with holder according to the second exemplary embodiment of the present invention.
Figure 5:
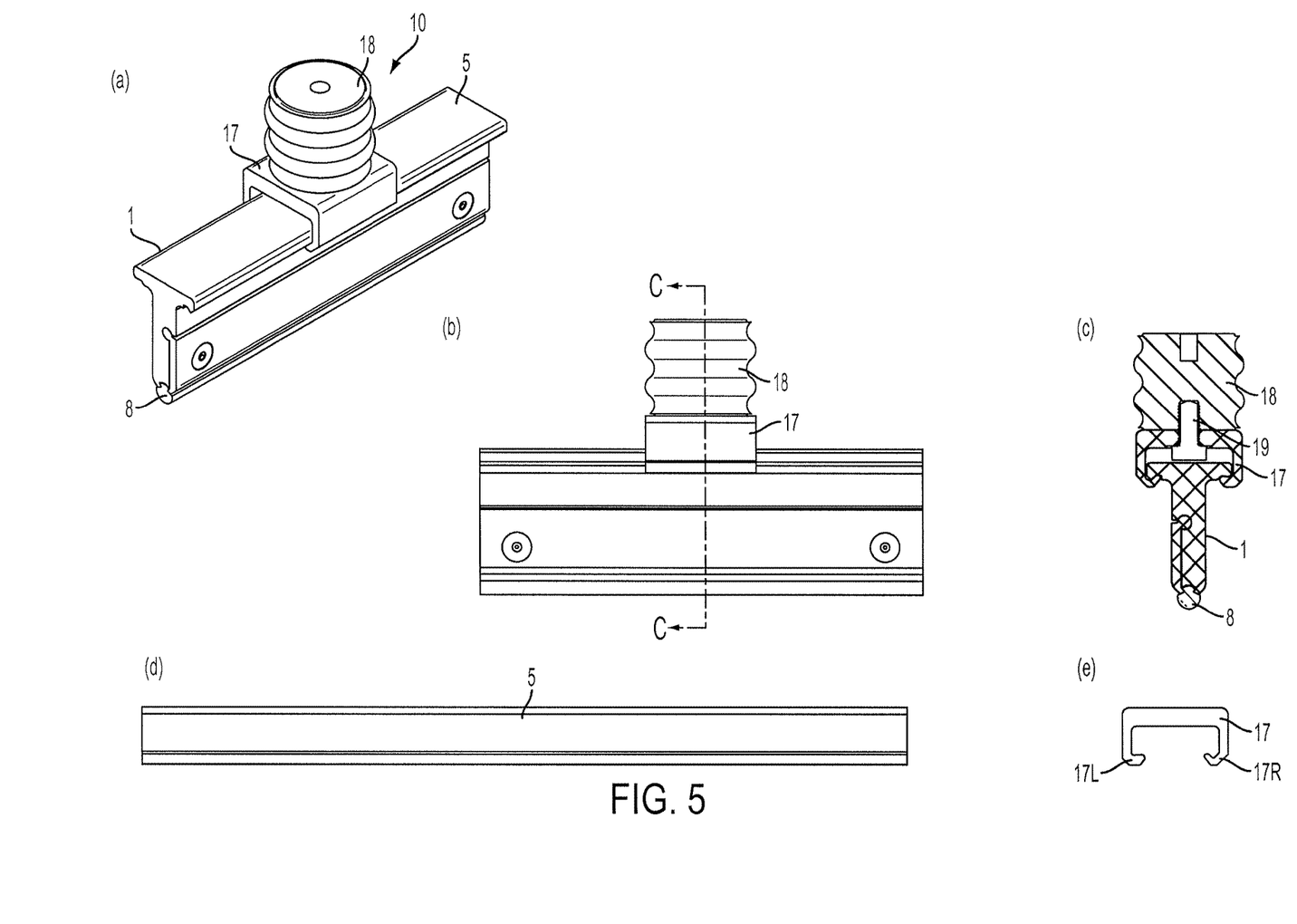
FIG. 5(a) shows a three dimensional view of an assembled state of the T-rail with holder according to the second exemplary embodiment of the present invention.
FIG. 5(b) shows a side view of an assembled state of the T-rail with holder according to the second exemplary embodiment of the present invention.
FIG. 5(c) shows a cross-section view along a C-C line of an assembled state of the T-rail with holder according to the second exemplary embodiment of the present invention.
FIG. 5(d) shows an underneath view of a side base of the T-rail extrusion according to the second exemplary embodiment of the present invention.
FIG. 5(e) shows a cross sectional view of the holder extrusions according to the second exemplary embodiment of the present invention.

The side base 5 may have a shape configured to facilitate the locking of the T-rail extrusion into a T-rail holder such as the T-rail extrusion holder 17 in FIGS. 4 and 5. For example, as shown in FIG. 3(*b*), the side base 5 may include a first protrusion 5L disposed along the side base 5 at a first end of a cross-section of the side base and a second protrusion 5L disposed on the side base 5 at another end of the cross-section of the side base. The protrusion 5R may have a different configuration and shape than the protrusion 5L. The shape of the side base 5 may be configured to allow for proper alignment and orientation during installation or replacement of T-rail sections and other components and items of the T-rail conductor system if, for example, assemblies need to be re-built in the field.

The T-rail—conductive wire assembly may be attached overhead of the railway system. A pantograph or trolley may be used to contact and slide over the conductive wire thereby collecting current from the conductive wire. The T-rail—conductive wire assembly may be configured such that the pantograph contacts and slides over the conductive wire 8 and does not contact the T-rail extrusion 1. For example, if the assembly formed by the rigid rail and the conductive wire is attached overhead with the side base 5 disposed upwards and the conductive wire 8 disposed downward, the assembly is configured such that the conductive wire 8 protrudes lower than any part of the T-rail extrusion 1 such that the pantograph or trolley contacts only the conductive wire 8.

The T-Rail extrusion 1 may be formed of extruded aluminum or other materials. The wire may be formed of copper, copper alloys, bronze, tin-plated bronze or other materials suitable for use in railway electrification systems. The dimensions of the rigid rail, the wires and the keeper may be adjusted function of the desired voltage and power of the railway electric current collection/distribution system. Further, the dimensions and the materials of the rigid T-rail conductor system may be adjusted function of a variety of parameters and conditions such as: overall cost, ease of installation and maintenance, overall height available for the railway system, environmental conditions, speed of the trains etc.

FIGS. 4 and 5 shows a second exemplary embodiment of the T-rail conductor system. The T-rail conductor system, according to the second exemplary embodiment, may include: a T-rail extrusion 1 (such as the one described above with respect to FIGS. 2 and 3), a holder 17, and an insulator 18. FIG. 4(*a*) shows a three dimensional exploded view and FIG. 4(*b*) shows a cross-section of an exploded view according to the second exemplary embodiment. FIG. 5(*a*) shows a three dimensional view of an assembled state, FIG. 5(*b*) shows a side view of the assembled state, and FIG. 5(*c*) shows a cross-section of the assembled state according to the second exemplary embodiment. FIG. 5(*d*) shows an underneath view of the side base 5 and FIG. 5(*e*) shows a cross section view of the extrusion holder 17 according to the second exemplary embodiment.

The assembly formed by the T-rail extrusion and the wire may be supported or suspended in an overhead position by one or more holder elements. The holder may be a T-Rail holder extrusion, such as the holder 17 in FIGS. 4 and 5, and may be "keyed" to the T-rail extrusion such as to ensure proper alignment of the T-Rail assemblies. As seen in FIG. 5(*a*), the holder 17 holds and supports the rigid rail 2 via the side base 5. The holder may be configured such as to restrict the motion of the rigid rail in a direction perpendicular to the rail but allows the rail to move or slide in a direction parallel to the rail. Thus, when the rigid rail assembly is installed horizontally the holder 17 keeps the rigid rail from moving vertically but may allow, if needed, the rigid rail to move horizontally by sliding in the holder 17. As seen in FIGS. 4(*b*) and 5(*e*) the holder extrusion 17 may include a first protrusion 17L and a second protrusion V-notch for alignment of T-rail 17R. The first protrusions 17L may have a different shape than the second protrusion 17R. The protrusions 17L may be keyed to the protrusion 5L of the T-rail extrusion side base 5. The protrusions 17R may be keyed to the protrusion 5R of the T-rail extrusion side base 5. However, the skilled artisan would understand that the T-rail and holder extrusions may be configured in many other configurations without departing from the spirit and scope of the present invention.

The insulator 18 may be configured to provide electrical isolation between undersurface structures and the overhead environment (e.g. tunnel ceiling, overpasses, bridges) so that grounding does not occur as the components of the T-rail system (e.g. wire, holders, T-rail extrusion) are "live" with current. The insulator 18 may be custom designed and configured for each particular situation and system such as to provide the necessary isolation. The insulator 18 may be attached to the T-rail extrusion 1 and/or holder extrusion 17 via a lockdown bolt 19 to keep feeder for sliding or becoming lose after installation.

Figure 6:
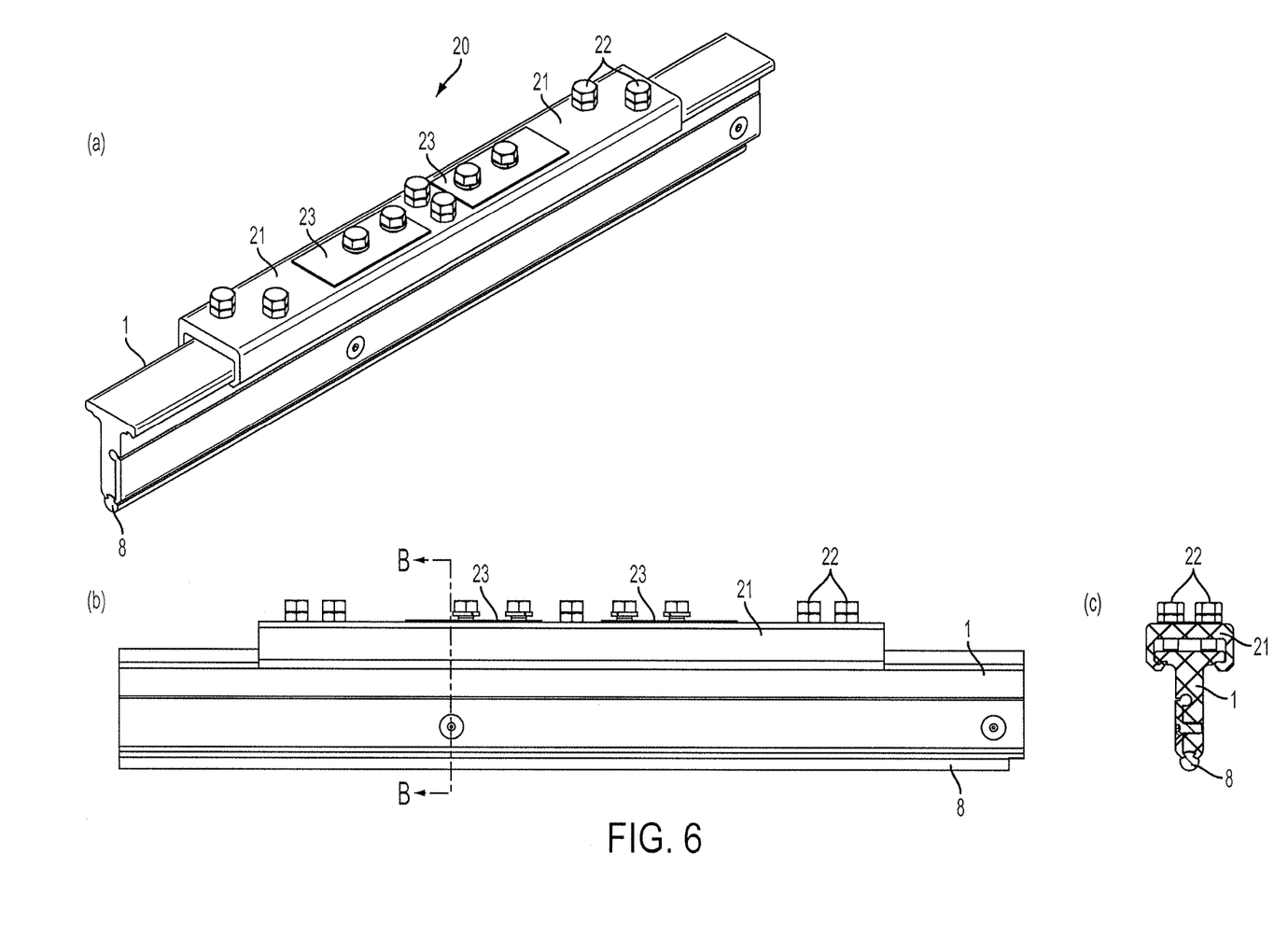
FIG. 6(a) shows a three dimensional view of a feeder assembly according to the third exemplary embodiment of the present invention.
FIG. 6(b) shows a side view of a feeder assembly according to the third exemplary embodiment of the present invention.
FIG. 6(c) shows a cross sectional view along a B-B line of a feeder assembly according to the third exemplary embodiment of the present invention.

FIG. 6 shows a third exemplary embodiment of the T-rail conductor system. The T-rail conductor system, according to the third exemplary embodiment, is a feeder assembly 20. The T-rail conductor system according to the third exemplary embodiment may include: a T-rail extrusion 1 (such as the one described above with respect to FIGS. 2 and 3), a holder extrusion 21 (may be similar to the holder extrusion 17 in FIGS. 4 and 5), one or more of bolts 22, and one or more bimetallic plates 23. FIG. 6(*a*) shows a three dimensional view, FIG. 6(*b*) shows a side view, and FIG. 6(*c*) shows a cross-section of the T-rail according to the third exemplary embodiment.

The bolts 22 are intended to mechanically lock the T-Rail holder extrusion 21 to the T-Rail extrusion 1 so that no movement is allowed. The feeder assembly 20 may be a point of connection between a power station or substation (not shown) and the T-Rail extrusion 1. Thus electric current may be transmitted from outside current sources to the T-Rail extrusion 1 and the wire 8 via the feeder assembly. The feeder assembly may be the main point of power transfer from the outside substations to the T-Rail extrusion 1 and the wire 8.

The bi-metallic plates 23 may have one top side made of bronze and one bottom side made of aluminum. The bi-metallic plate may serve for transferring the current from a bronze-feeder (not shown) to an aluminum profile such as the T-Rail extrusion 1. The bronze-feeder may come as a shielded or unshielded cable or wire. The bi-metallic plates may be permanently fused and/or joined component (i.e. the bronze side is fused to the aluminum side) that cannot be separated and are configured to prevent corrosion that may occur because of dissimilar metals. Alternatively, the bi-metallic plates 23 may be omitted, by tin-plating the feeder assembly 20 thereby achieving the same result and function of preventing corrosion without the need for bi-metallic plates. The bi-metallic plates 23 may be omitted if the feeder is made of the same material as the rail (e.g. aluminum). An aluminum power transition plate may be used inside the holder extrusion between the top side of the T-rail and the underside of the holder extrusion.

Figure 7:
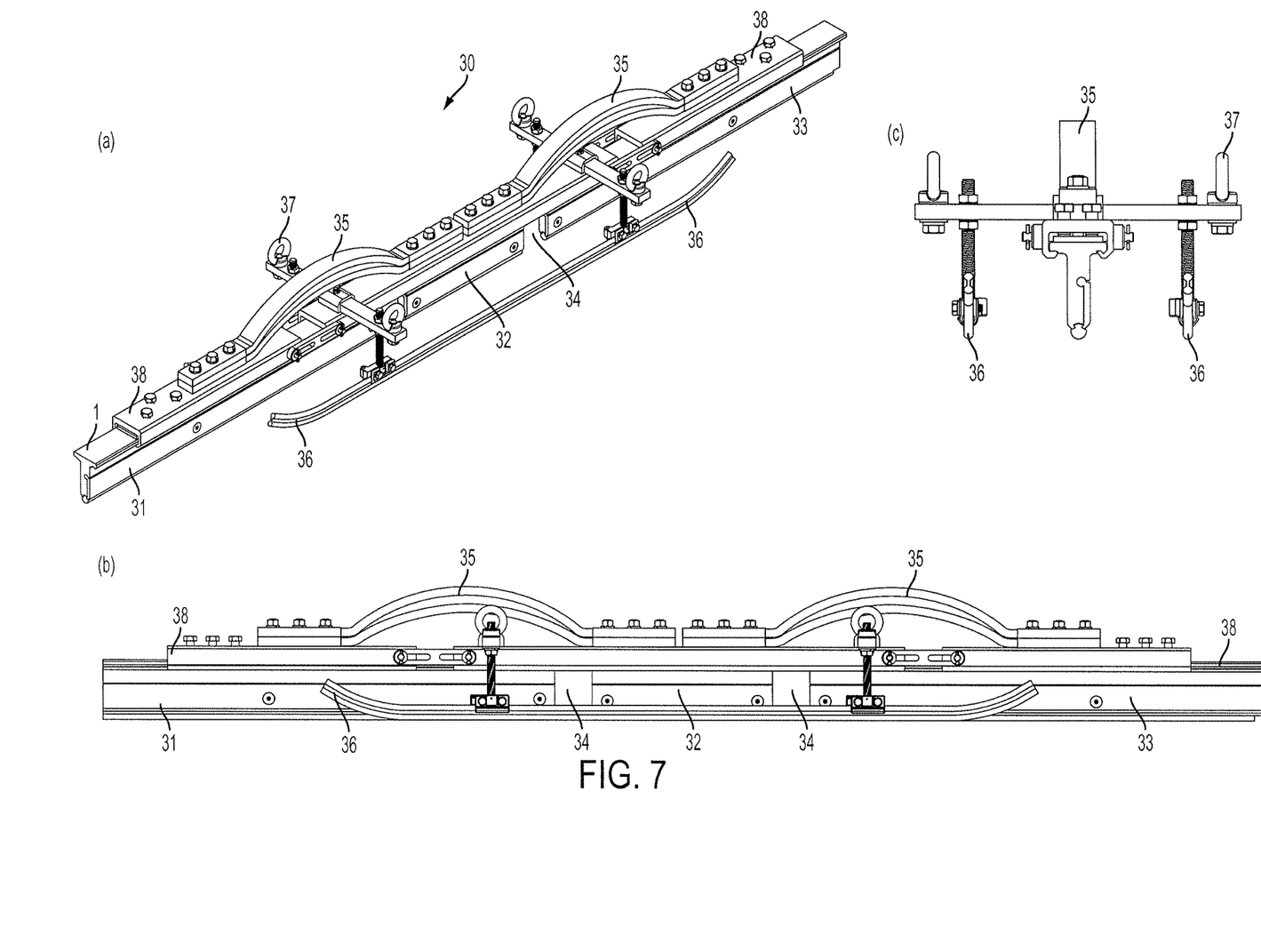
FIG. 7(a) shows a three dimensional view of a T-rail expansion joint assembly according to the fourth exemplary embodiment of the present invention.
FIG. 7(b) shows a side view of a T-rail expansion joint assembly according to the fourth exemplary embodiment of the present invention.
FIG. 7(c) shows a cross sectional view of a T-rail expansion joint assembly according to the fourth exemplary embodiment of the present invention.

FIG. 7 shows a fourth exemplary embodiment of the T-rail conductor system. The T-rail conductor system, according to the fourth exemplary embodiment, is a T-rail expansion joint assembly 30. FIG. 7(*a*) shows a three dimensional view, FIG. 7(*b*) shows a side view, and FIG. 7(*c*) shows a cross-section of the T-rail expansion joint assembly 30 according to the fourth exemplary embodiment.

The T-rail expansion joint assembly may include: a first T-rail extrusion segment 31; a second T-rail extrusion segment 32; a third T-rail extrusion segment 33; one or more holder extrusions 38; continuity shunts 35; pantograph gliders 36; and insulated support hangers 37. The segments 31-33 are T-rail extrusions of the same type as the ones described above with respect to FIGS. 2 and 3. The T-rail extrusion segments 31, 32, and 33 may be separated by expansion gaps 34. The holder extrusion 38 may be of the same type as the holder extrusion 17 in FIGS. 4 and 5.

The expansion joint assembly 30 is configured to accommodate expansion and contraction of the continuous T-rail extrusions because of temperature variations of the T-rail. The temperature of T-rail may vary in time because of variations in the ambient temperature and because of heat buildup within the T-Rail conductor system.

The continuity shunt 35 is the main power transferring component between the moving/expanding segments, such as segments 31-32, as there can be no electricity/power isolation between the T-rail extrusion segments or gaps between the entering and existing sides of the system. The continuity shunts 35 may be formed of flexible conductors and may include a plurality of bent sections having a gaping between them. The plurality of sections may come as cables and/or shunts. The gaping between the bent sections allows for increased amperage across the circular mills of the flexible cables/shunts.

The pantograph gliders 36 are configured to protect the pantograph carbons of a vehicle (e.g. a train) as the vehicle travels through the expansion joint assembly. In the absence of the pantograph gliders 36 the pantograph of the vehicle would likely become hung in the expansion gaps 34 and create a catastrophic failure of the pantograph system.

Figure 8:
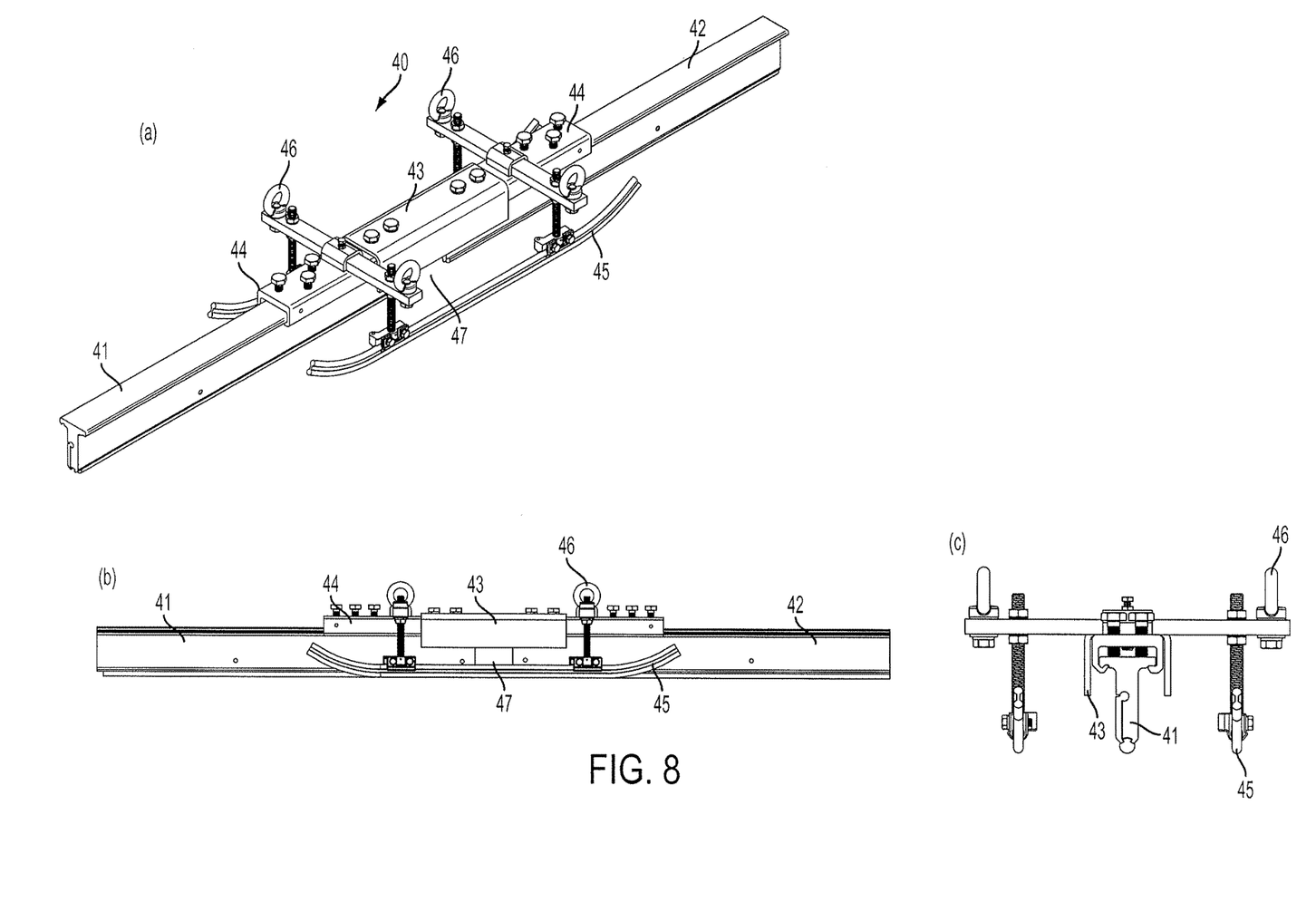
FIG. 8(a) shows a three dimensional view of a T-rail section isolation assembly according to the fifth exemplary embodiment of the present invention.
FIG. 8(b) shows a side view of a T-rail section isolation assembly according to the fifth exemplary embodiment of the present invention.
FIG. 8(c) shows a cross sectional view of a T-rail section isolation assembly according to the fifth exemplary embodiment of the present invention.

FIG. 8 shows a fifth exemplary embodiment of the T-rail conductor system. The T-rail conductor system, according to the fifth exemplary embodiment, is a T-rail section isolation assembly 40. FIG. 8(*a*) shows a three dimensional view, FIG. 8(*b*) shows a side view, and FIG. 8(*c*) shows a cross-section of the T-rail section isolation assembly 40 according to the fourth exemplary embodiment.

The T-rail section isolation assembly 40 may include: first T-rail segment 41, second T-rail segment 42, an insulating member 43, holder extrusions 44, pantograph gliders 45, and insulated support hangers 46. The T-rail segments 41 and 42 may be separated by a gap 47. The section isolation assembly may be necessary when there are two, or more, separate power sources powering the T-rail conductor system. These two separate power sources cannot continuously share power between them as this would short out the system. Therefore, a section isolation assemblies may be used such as to isolate from each other the sections of the system powered by different power sources. Item 44 is a T-rail holder low/no-tension dead-end for section isolation assembly. The insulating member 43 may be made of various grades of insulation material such as to provide both strength and isolation between phases of the system. The section isolation insulation medium may be made of composite non-conductive materials (i.e. Glass reinforced composites, Porcelain). The insulated support hangers 46 may be used to provide additional support for the system and to provide electrical insulation of the T-tail system. Supporting elements can be affixed to these eye components without grounding the T-rail conductor system. The pantograph gliders 45 allow for smooth transition of the pantograph of a vehicle through the isolation assembly without damage to the pantograph carbon member. The transition gliders are intended to serve as a momentary bridge of power between phases of the system and/or non-bridging application depending on system requirements. A fixed insulated transition member that would sustain the integrity of a trolley shoe system may be provided in gap 47. This type of system would not require gliders.

The T-rail section isolation assembly 40 may be adapted to be used in trolley vehicle systems and with trolley shoes. If used with trolley vehicle systems and trolley shoes, instead of pantograph vehicle systems, the assembly 40 does not require the glider 45 which would be replaced by a non-conductive strength member (not shown) which would mimic the shape of the T-rail between live sections of the system (e.g. between the T-rails 41 and 42) thus creating a smooth passage of the trolley shoe.

In another exemplary embodiment the T-rail section isolation assembly 40 may include both the pantograph gliders 45 (configured for use with pantograph vehicles) and a non-conductive strength member (configured for use with the trolley shoes of a trolley vehicle) thus creating a smooth passage of the trolley shoe and pantograph carbon across the section isolation assembly. This way the T-rail conductor system may be used for both pantograph and/or trolley shoe operation.

Figure 9:
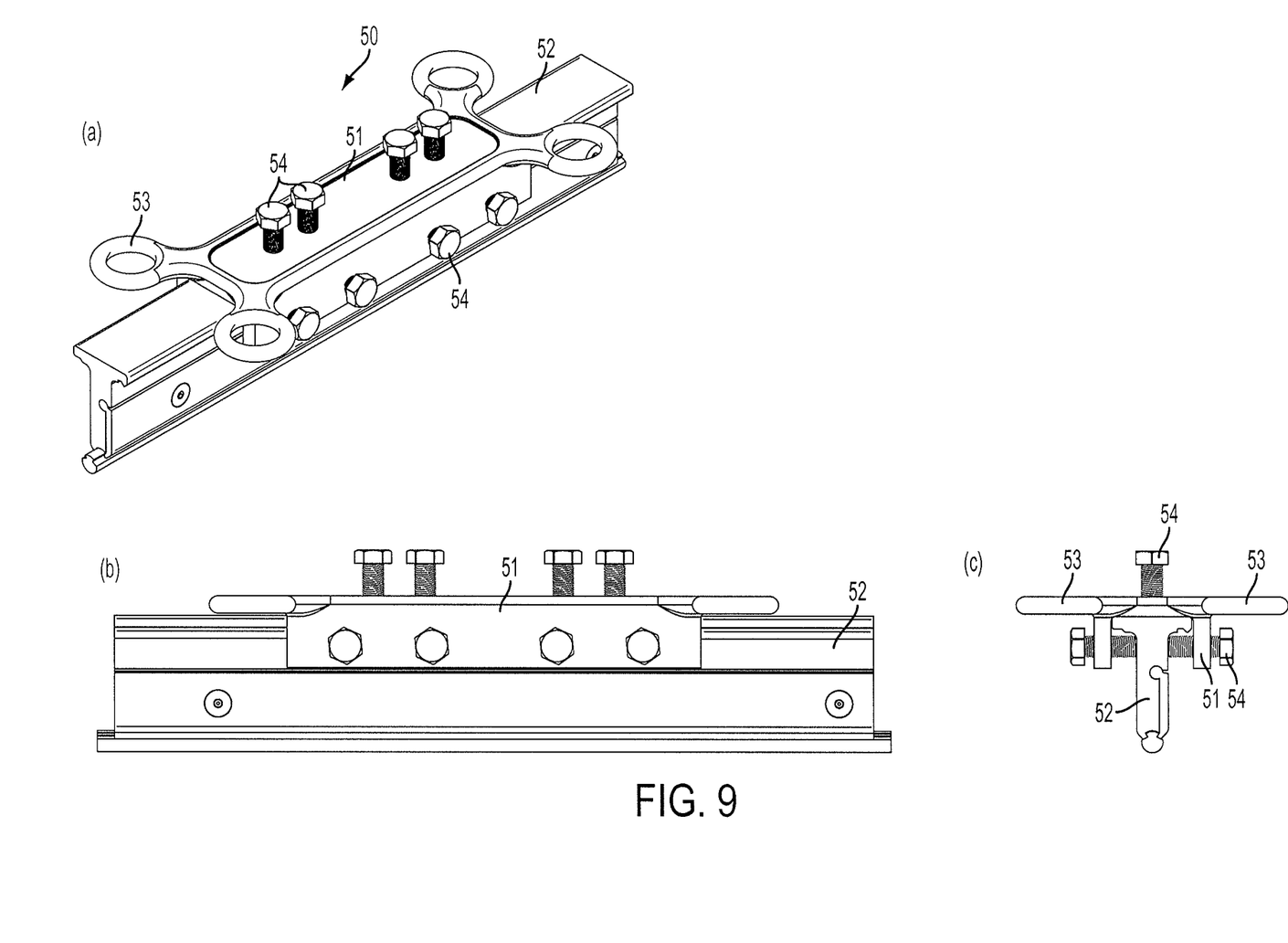
FIG. 9(a) shows a three dimensional view of a T-rail mid-point assembly according to the sixth exemplary embodiment of the present invention.
FIG. 9(b) side view of a T-rail mid-point assembly according to the sixth exemplary embodiment of the present invention.
FIG. 9(c) shows a cross sectional view of a T-rail mid-point assembly according to the sixth exemplary embodiment of the present invention.

FIG. 9 shows a sixth exemplary embodiment of the T-rail conductor system. The T-rail conductor system, according to the sixth exemplary embodiment, is a T-rail mid-point assembly 50. FIG. 9(*a*) shows a three dimensional view, FIG. 9(*b*) shows a side view, and FIG. 9(*c*) shows a cross-section of the T-rail mid-point assembly 50 according to the sixth exemplary embodiment.

The T-rail mid-point assembly 50 may include a mid-point bracket 51 mounted on the T-rail 52. The mid-point assembly may be configured to create a fixed point in the middle of a span of T-rail whereby expansion and contraction is directed away from the mid-point assembly in either direction (normally towards expansion joint assemblies).

The mid-point bracket may include portions 53 whereby external brackets of cable structures are affixed to create the mid-point integrity. The mid-point assembly may be attached and fixed to an external support structure, such as a tunnel ceiling, a bridge beam, an overpass ceiling and other support structures. The screws 54 may be mid-point lockdown screws configured to mechanically prevent the mid-point bracket assembly 50 from sliding along the T-Rail extrusion profile.

Figure 10:
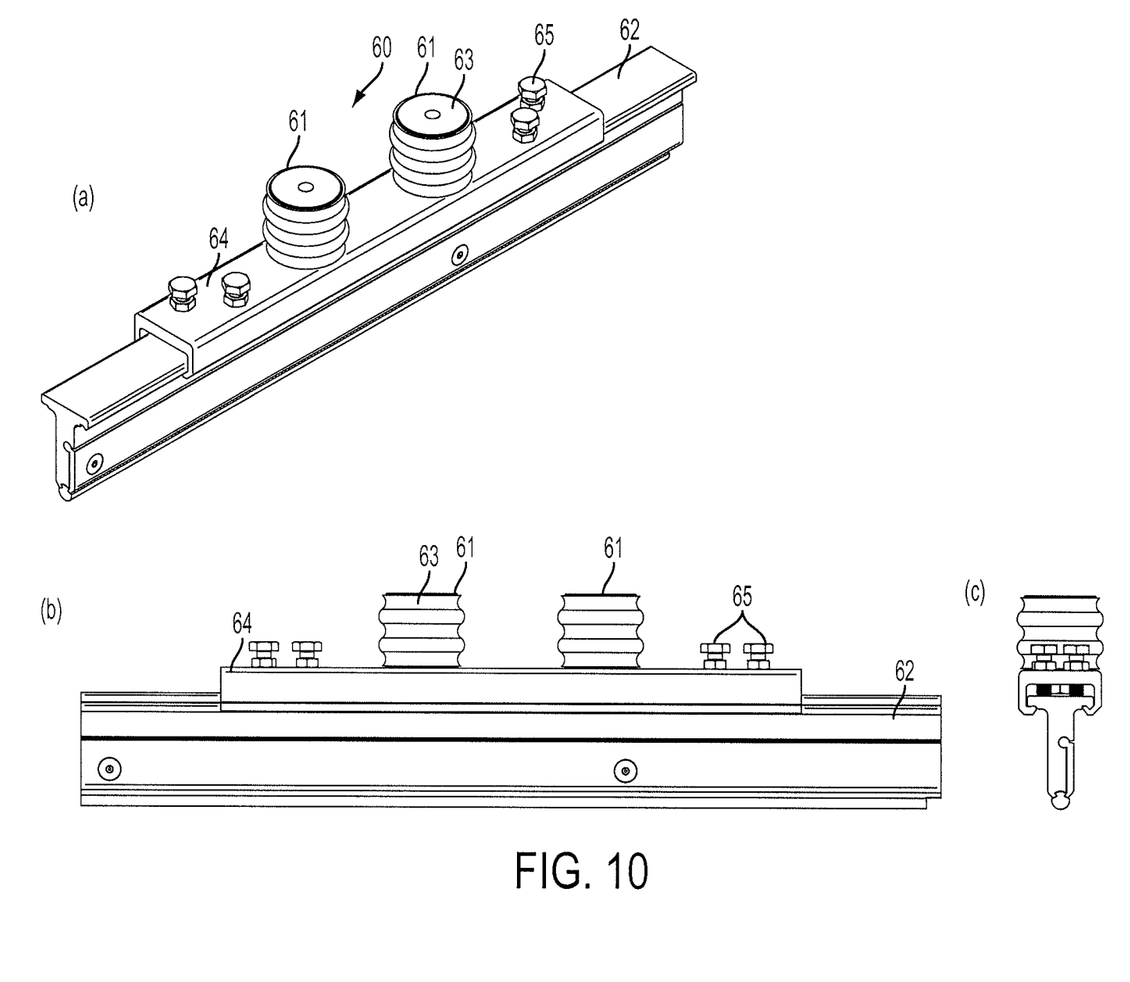
FIG. 10(a) shows a three dimensional view of a T-rail insulated support bracket assembly according to the seventh exemplary embodiment of the present invention.
FIG. 10(b) shows a side view of a T-rail insulated support bracket assembly according to the seventh exemplary embodiment of the present invention.
FIG. 10(c) shows a cross sectional view of a T-rail insulated support bracket assembly according to the seventh exemplary embodiment of the present invention.

FIG. 10 shows a seventh exemplary embodiment of the T-rail conductor system. The T-rail conductor system, according to the seventh exemplary embodiment, is a T-rail insulated support bracket assembly 60. FIG. 10(a) shows a three dimensional view, FIG. 10(b) shows a side view, and FIG. 10(c) shows a cross-section of the T-rail insulated support bracket assembly 60 according to the seventh exemplary embodiment. The T-rail insulated support bracket assembly 60 includes an insulated support bracket 61 mounted over a T-rail extrusion section 62. The insulated support bracket 61 may include one or more support insulators 63, a holder extrusion 64 and fixing screws 65. The holder extrusion 64 may be substantially identical or similar with the holder extrusion 17 in FIGS. 4 and 5. The support insulators may be identical or similar with the insulators 18 in FIGS. 4 and 5. The insulated support bracket is configured to provide a similar function to that of the mid-point bracket in FIG. 9, that is the insulated support bracket locks the T-rail from moving fore or aft of the assembly 60 as the bracket is mounted to the underside of a supporting structure, such as a tunnel ceiling, via the insulators 63.

The rigid T-rail conductor systems described in the exemplary embodiments of the present invention allow for ease of installation and maintenance and do not require special tools, outside of standard lineman's tools, for installation and maintenance. Also, overhead third rail collection/distribution systems described in the exemplary embodiments of the present invention allow for joint use with both trolley vehicle systems and pantograph vehicle systems.

The rigid T-rail conductor systems described in the exemplary embodiments of the present invention pose a significantly lower risk of accidental contact with the electrified rail than the regular third rail systems because the live components are disposed at an elevated height over the tracks. Thus, the rigid T-rail conductor systems described in the exemplary embodiments of the invention are suitable for use with higher voltages and higher speed trains. When compared with other overhead collection/distribution systems, such as the flexible catenary, the rigid T-rail conductor systems described in the exemplary embodiments of the present invention have the advantage that they require less overall height for assembly and, consequently, are more suitable for use within low profile locations such as tunnels, bridges, maintenance shops, overpasses and any other structure requiring reduced height electrification. Moreover, the T-rail conductor systems described in the exemplary embodiments of the present invention do not require a secondary feeder or power distribution messenger cable or wire. This makes the installation of the T-rail conductor systems more economical when compared with systems that need a secondary feeder or messenger. The T-Rail system can use spooled contact wire or contact wire in pre-straightened segments or other wire shapes. Further, the T-Rail system can accommodate other shapes of extrusion for the purpose of transferring power from the extrusion to the pantograph/trolley shoe. For example, the T-rail can accommodate other shapes that are not contact wire.

Thus, the overhead third rail collection/distribution systems, according to the exemplary embodiment of the present invention, are suitable for use both in high speed applications and in situations involving reduced overall heights of the transportation system.

The rigid T-rail conductor systems described in the exemplary embodiments of the present invention may further include and/or employ various supporting components such as hangers, splice joints, cross-overs, dead ends, feeders, expansion joints, anchors, insulated covers, transition gliders, etc. The rigid T-Rail conductor systems described above may be used in conjunction with various equipment, devices, hardware and software that may be necessary or desirable to the specific transportation system. The T-rail conductor systems described in the exemplary embodiments of the present invention may accommodate and may be used with various other assemblies, such as: Door Bridge Assemblies, Shop Hanger Assemblies, Turn-out Transition Glider Assemblies, Alignment Knuckle Assemblies, Transition Dead-ends from Main-Line OCS to T-Rail, Vibration Mitigation assemblies, etc.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed:

1. A rigid rail conductor system for supporting at least one contact wire in an overhead railway electrification system, the rigid rail comprising:
   a T-rail configured to be disposed in an overhead position of the railway electrification system, the T-rail being configured to support and affix to the rail a conductive wire, the T-rail comprising a base and a central span extending from the base; and
   a keeper disposed on a side of the central span and movably connected to the central span, the keeper being configured to be movable between a first position and a second position;
   wherein, when the keeper is in the first position, the keeper holds and affixes the wire on the T-rail; and
   wherein, when the keeper is in the second position, the keeper allows the wire to be removed from the T-rail.

2. The rigid rail conductor system of claim 1, wherein:
   when the keeper is moved from the first position to the second position, the keeper is kept attached to the central span by a hinge such that when the conductive wire is replaced or installed the keeper does not separate from the central span.

3. The rigid rail conductor system of claim 2, wherein:
   the keeper comprises a first rounded side,
   the central span comprises a rounded cavity for accepting and flash fitting the first rounded side of the keeper; such that the first rounded side of the keeper and the rounded cavity of the central span form the hinge.

4. The rigid rail conductor system of claim 1, wherein the keeper is affixed to the central span by one or more set screws.

5. The rigid rail conductor system of claim 1, wherein:
the keeper comprises a protrusion disposed on one side of the keeper and extending over the length of the keeper, and
the protrusion fits into a grove formed over the length of the wire such as to keep the wire attached to the T-rail.

6. The rigid rail conductor system of claim 1, further comprising:
a holder configured to support or suspend the rigid rail conductor system in an overhead position.

7. The rigid rail conductor system of claim 6, wherein:
the holder is an extrusion holder and is keyed to the T-rail such as to ensure the alignment of one or more T-rail sections and one or more T-rail components.

8. The rigid rail conductor system of claim 6, further comprising:
an insulator attached to one or more of the following: the holder and the T-rail;
wherein the insulator is configured to provide electrical isolation between live portions of the T-rail and the overhead structures supporting the T-rail.

9. The rigid rail conductor system of claim 1, further comprising:
a feed assembly configured to provide a point of connection between the T-rail and a power station for transmitting electric current to the rigid rail conductor system.

10. The rigid rail conductor system of claim 9, wherein the feed assembly comprises:
a bi-metallic plate configured to transfer current from a bronze-feeder to an aluminum profile such as to prevent corrosion from occurring between dissimilar metals.

11. The rigid rail conductor system of claim 10, wherein the bi-metallic plate comprises one top side made of bronze fused or joined with one bottom side made of aluminum.

12. The rigid rail conductor system of claim 9, wherein the feeder assembly is tin-plated such as to prevent corrosion from occurring between dissimilar metals.

13. The rigid rail conductor system of claim 1, further comprising:
a T-rail expansion joint assembly configured to accommodate expansion and contraction of the T-rail because of temperature variations.

14. The rigid rail conductor system of claim 13, wherein the T-rail expansion joint assembly comprises:
one or more continuity shunts connecting successive T-rail segments of the rigid conductor system,
wherein the successive T-rail segments are separated by gaps configured to accommodate the expansion and contraction of the T-rail segments.

15. The rigid rail conductor system of claim 14, wherein the continuity shunts are formed of flexible conductors and comprise a plurality of bent sections having a gaping between them.

16. The rigid rail conductor system of claim 14, wherein the T-rail expansion joint assembly further comprises:
one or more pantograph gliders configured to protect pantograph carbons of a vehicle as the pantograph moves over the gaps between successive T-rail segments in the expansion joint assembly.

17. The rigid rail conductor system of claim 1, further comprising:
a T-rail section isolation assembly configured to electrically isolate from each other a first T-rail section of the rigid rail conductor system and a second T-rail section of the T-rail conductor system;
wherein the first T-rail section is powered by a first power source and the second T-rail section is powered by a second power source different from the first power source.

18. The rigid rail conductor system of claim 17, wherein the T-rail section isolation assembly comprises:
an insulation member configured to insulate from each other the first T-rail section and the second T-rail section;
wherein the first T-rail sections is separated from the second T-rail section by a gap.

19. The rigid rail conductor system of claim 17, wherein the T-rail section isolation assembly further comprises:
one or more pantograph gliders configured to protect pantograph carbons of a vehicle as the pantograph moves over a gap between first T-rail section and the second T-rail section.

20. The rigid rail conductor system of claim 17, wherein the T-rail section isolation assembly further comprises:
a non-conductive strength member disposed over a gap between the first T-rail section and the second T-rail section;
wherein the non-conductive strength member mimics the shape of the T-rail thereby creating a smooth passage for a trolley shoe.

21. The rigid rail conductor system of claim 20, wherein the T-rail section isolation assembly further comprises:
one or more pantograph gliders configured to protect pantograph carbons of a vehicle as the pantograph moves over a gap between first T-rail section and the second T-rail section;
wherein the section isolation assembly is configured to work with both pantographs and trolley shoes.

22. The rigid rail conductor system of claim 1, further comprising:
a T-rail mid-point assembly configured to create a fixed point in the middle of a span of T-rail such that expansion and contraction is directed away from the mid-point assembly.

23. The rigid rail conductor system of claim 1, wherein the mid-point assembly comprises mid-point bracket attached on a T-rail section, the mid-point bracket being attached and fixed to an external supporting structure.

24. The rigid rail conductor system of claim 1, further comprising:
a f-rail insulated support bracket assembly configured to lock the T-rail from moving fore and aft.

25. The rigid rail conductor system of claim 24, wherein the T-rail insulated support bracket assembly comprises one or more support insulators mounted on a T-rail holder and mounted to the underside of an external supporting structure.

26. A rigid rail conductor system for supporting at least one contact wire, the rigid rail conductor system comprising:
an extruded shaped rail configured to support and affix to the rail a conductive wire, the extruded shaped rail comprising a base and a central span extending from the base; and
a keeper element disposed on the central span and hingedly connected to the central span, the keeper element being configured to affix the conductive wire to the extruded shaped rail.

* * * * *